United States Patent [19]

Condon et al.

[11] Patent Number: 4,749,429
[45] Date of Patent: Jun. 7, 1988

[54] PROCESS OF MOUNTING CLAY ROPE ON CARDBOARD

[75] Inventors: Thomas E. Condon, Richardson; Marshall E. Billig, Marshall, both of Tex.

[73] Assignee: Foseco International Limited, Birmingham, England

[21] Appl. No.: 283,878

[22] Filed: Jul. 16, 1981

[51] Int. Cl.⁴ ............ B22D 33/04; B29C 53/04; F16J 15/10
[52] U.S. Cl. .................. 156/242; 156/334; 164/137; 249/174; 249/204; 264/241; 264/242; 277/189; 277/228; 277/229; 277/DIG. 6
[58] Field of Search ............... 264/60, 242, 248, 241; 156/334, 242; 249/174, 204; 277/189, 228, 229, DIG. 6; 164/137

[56] References Cited

U.S. PATENT DOCUMENTS

| | | | |
|---|---|---|---|
| 1,164,739 | 12/1915 | Mershon | 264/248 |
| 2,148,054 | 2/1939 | Berlek | |
| 2,970,905 | 2/1961 | Doll | 264/60 |
| 3,137,602 | 6/1964 | Lincoln | 264/60 |
| 3,418,410 | 12/1968 | EinFalt | 264/242 |
| 3,435,501 | 4/1969 | Paul | 264/242 |
| 4,111,706 | 9/1978 | LaBate | 106/44 |
| 4,369,830 | 1/1983 | Generali | 249/174 |

FOREIGN PATENT DOCUMENTS 2937515 3/1980 Fed. Rep. of Germany .

Primary Examiner—Jan H. Silbaugh
Assistant Examiner—Leo B. Tentoni
Attorney, Agent, or Firm—Nixon & Vanderhye

[57] ABSTRACT

A sealing structure is disposed between a metal-casting ingot mold bottom portion and a bottom plate to prevent the leakage of molten steel between the mold and plate. A clay rope disposed in a closed configuration corresponding to the bottom of the ingot mold is affixed to the cardboard sheet with an adhesive system. Overlapping portions of the cardboard sheet are grasped to position the clay rope directly under the ingot mold, and the mold is lowered onto the bottom plate. Hot glue (or pressure sensitive adhesive tape and/or white glue) holds the clay rope on the cardboard sheet. The clay rope is offset at a central portion of the sheet to allow folding of the sheet for transport.

11 Claims, 1 Drawing Sheet

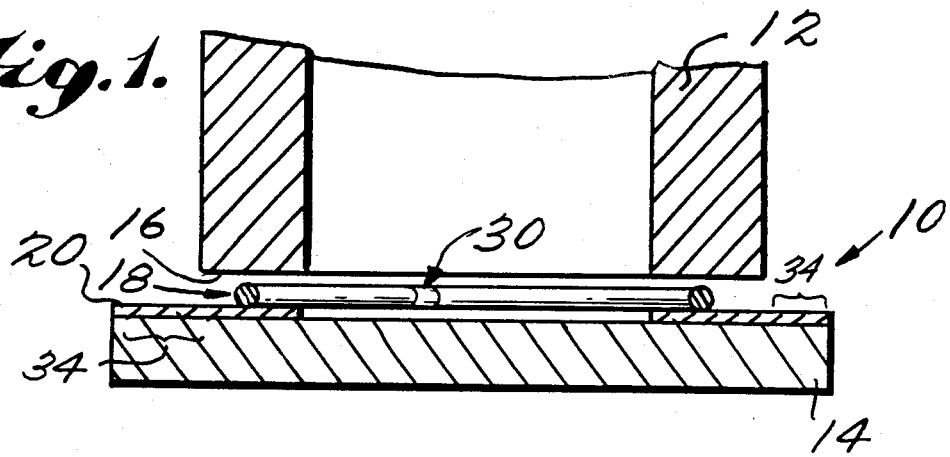
Fig. 1.
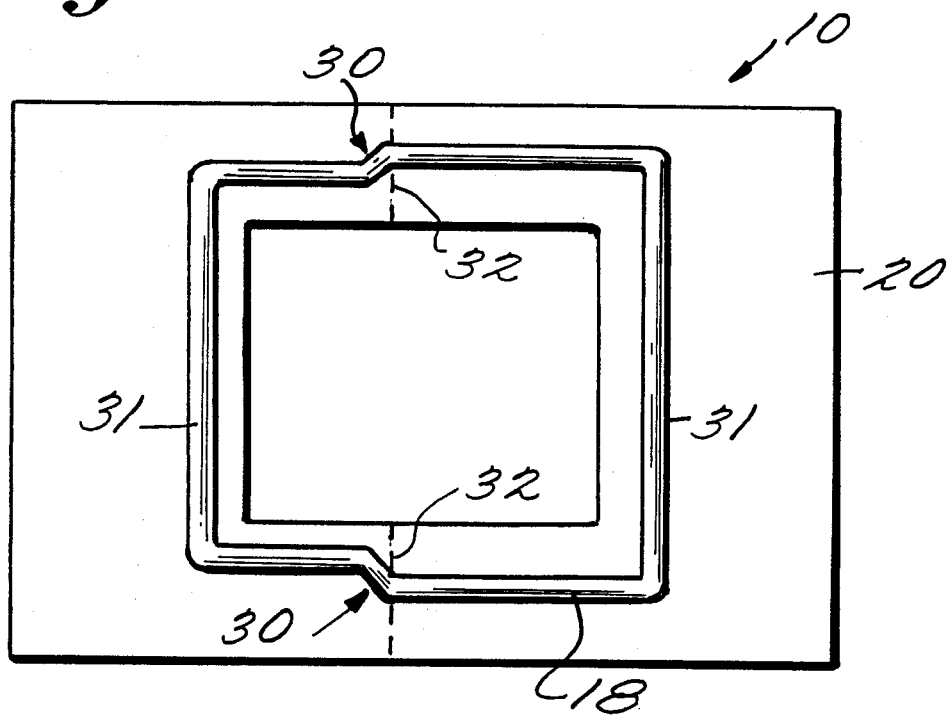
Fig. 2.
Fig. 3.
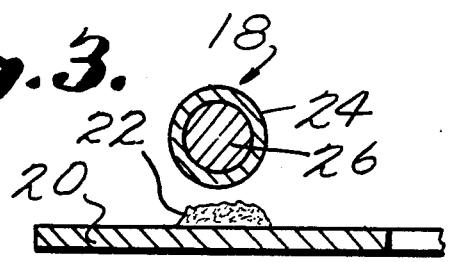
Fig. 4.
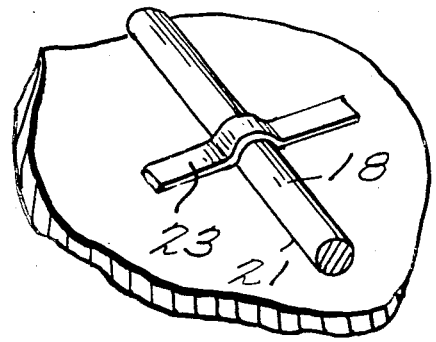

PROCESS OF MOUNTING CLAY ROPE ON CARDBOARD

BACKGROUND AND SUMMARY OF THE INVENTION

In the casting of molten steel to make ingots, it is desirable for economical reasons in some cases to make the mold into which the steel is cast in two pieces. One piece, called an "ingot mold", resembles a rectangular or circular tube which is tapered such that the opening at one end thereof is larger than the opening at the other. The other piece, normally a flat cast-iron plate, is called a "bottom plate". The ingot mold is set on the bottom plate with the axis of the ingot mold vergital and the smaller opening at the top. Molten steel is poured from a ladle into a series of molds, which are usually set on railroad flatbed cars so that they can be moved about easily. As the steel solidifies, it contracts slightly creating a small clearance between the ingot and the mold walls. Upon completion of the solidification, a crane grasps the mold by lugs cast into the outside wall of the mold, and lifts it off the bottom plate, leaving the ingot standing on the bottom plate.

A major weakness of the above-described casting system is that steel will leak between the mold and bottom plate unless a gasket or some other sealing material is installed between the surfaces of the ingot mold and bottom plate. The leaks of molten steel are dangerous to personnel in the area, damage railroad equipment on which the molds are set, and form a fin at right angles to the axis of the ingot. This fin is a waste of steel and must be removed by flame-cutting or sawing so that the ingot can pass easily through the rolling mill.

A number of procedures have been tried and proposed in the past for solving the above-mentioned problems in the casting of steel ingots. However, all such prior techniques and proposals have been proven to be unsatisfactory in at least one respect.

One prior procedure to prevent leakage of molten steel between the ingot mold and bottom plate has been to put steel strips into the gaps. However, these strips cannot fill any gaps smaller than their thickness, and a good deal of operator observation, time, and judgment is required to locate the existence of any gaps and fill them properly.

Another prior art procedure to is pack the spaces with refractory mortar. This is done conventionally from the outside of the mold, which results in mortar not getting through the gap to the inner part of the mold. Thus, the steel still leaks at least a part of the way from the inside of the mold to the outside (a distance that can be as much as 8") so that a fin is still formed. While the placing of mortar from the inside could solve this problem, such a procedure would result in refractory inclusions in the ingot, and is dangerous to personnel who would have to be lowered into a hot mold (sometimes 8' deep).

Another prior procedure is to put "clay rope" on the bottom plate before the mold is set, the clay rope configured in an outline to mesh with the shape of the mold where it contacts the bottom plate. "Clay rope" conventionally refers to a plastic tube (e.g., polyethylene) filled with a mixture of clay and water. The mold squashes the clay rope as it is set on the bottom plate, and the clay breaks out of the tube and effectively fills the gaps between the mold and plate. However, it is quite difficult to locate the molds on the bottom plates in the same place every time because cranes utilized to do so are not controllable in such a fine manner. Thus, personnel must guess where to put the clay rope so that the mold will match the rope configuration. Further, especially in the case of large bottom plates, it is difficult for personnel to lay the rope out properly because the plates are hot and have normally just been sprayed with a protective coating. Sometimes this problem is overcome by the crane operator suspending the mold just a few inches above the bottom plate while the clay rope is moved under it. However, this creates a serious risk of injury.

According to the present invention, all of the above-mentioned difficulties are overcome. According to the present invention, a method and product are provided that effect precise location, safety, and time savings in the placement of sealant between an ingot mold and bottom plate.

According to the present invention, a method of making a sealing structure adapted to be disposed between a metal-casting ingot mold and a bottom plate is provided. The ingot mold has a circumferentially extending bottom portion, and the method utilizes a cardboard sheet, an elongated flexible sealing element (preferably clay rope) and an adhesive system. The flexible sealing element can be laid out in a production operation in exactly the right configuration for any ingot mold. The sealing element is placed on the cardboard sheet so that it assumes substantially a closed configuration on the sheet corresponding to the circumferentially extending bottom portion of the mold. The sealing element is affixed to the cardboard sheet solely with the adhesive system. The adhesive system may comprise cold glue and tape, but preferably comprises hot glue. The hot glue is first placed on the cardboard sheet in the proper outline configuration, and the sealing element (e.g., clay rope) is then disposed on top of the hot glue immediately after its application.

In order to facilitate utilization of the cardboard-mounted sealant, preferably the cardboard sheet is selected so that it has at least one dimension thereof greater than the corresponding dimension of the mold with which it is designed to operate, providing an overlapping portion. The operator grabs the overlapping portion during use, and by moving the cardboard sheet by grasping the overlapping portion, the operator is able to exactly position the sealant in place as the ingot mold is being lowered, without a safety risk.

In order to facilitate transportation of the cardboard-mounted sealant from the manufacturing location to a steel mill, it is desirable to place the sealing element on the cardboard sheet so that it is offset at a central portion of the sheet. The sealing element still conforms to the general configuration of the ingot mold circumferentially extending bottom portion (which is significantly wider than the sealing element), but it allows the cardboard to be folded without the sealing element overlapping itself. Once folded, the sheet is easier to transport. When the sheet arrives at the steel mill, the operator unfolds the sheet, places it on the bottom plate in proper position with respect to the ingot mold, and then the ingot mold is lowered onto the bottom plate, squashing the clay rope.

It is the primary object of the present invention to provide a method and product for sealing between the metal-casting ingot mold and bottom plate that allows precise location of the seal, is safe to use or practice, and minimizes the time necessary to place the seal. This and other objects of the present invention will become clear from an inspection of the detailed description of the invention, and from the appended claims.

BRIEF DESCRIPTION OF THE DRAWINGS

FIG. 1 is a vertical cross-sectional view illustrating an exemplary sealing structure according to the present invention in use with an exemplary ingot mold and bottom plate;

FIG. 2 is a top plan view of the sealing structure of FIG. 1;

FIG. 3 is an enlarged, exploded, cross-sectional detailed view of the main component parts of the preferred sealing structure according to the present invention; and FIG. 4 is a detail perspective view—partly in cross-section and partly in elevation—of another manner of fixing clay rope to cardboard.

DETAILED DESCRIPTION OF THE DRAWINGS

An exemplary sealing structure according to the present invention is illustrated generally at 10 in the drawings. The sealing structure is designed for use with an ingot mold 12 and bottom plate 14 of conventional construction. The ingot mold 12 is a generally tubular structure having a circumferentially extending bottom portion 16. The sealing structure 10 may be utilized with virtually any conventional ingot mold 12 and bottom plate 14.

A preferred embodiment of the sealing structure 10 is illustrated in the drawing, and includes as the major components thereof an elongated flexible sealing element 18, a cardboard sheet 20, and an adhesive system, such as the hot glue strip 22 illustrated in FIG. 3.

The sealing element 18 can take a variety of forms, such as disclosed in U.S. Pat. No. 4,369,830 or in British Pat. No. 1,404,312. In its preferred form, however, the sealing element 18 comprises a clay rope. "Clay rope" is terminology used in the art for a commercially available sealant structure comprising an outer polyethylene tube 24 (see FIG. 3) or the like surrounding an interior mixture 26 of clay and water or the like. Various other materials, such as disclosed in U.S. Pat. No. 4,111,706 (the disclosure of which is hereby incorporated by reference herein) may also be provided.

The structure 20 preferably comprises a conventional thick piece of rigid cardboard, such as a piece 4'×5'×⅛" thick. It is to be understood, however, that the term "cardboard" as used in the present specification and claims also comprises other fibrous sheet material having properties functionally equivalent to common cardboard.

The adhesive system preferably comprises hot glue, such as the strip 22 of hot glue illustrated in FIG. 3. When hot glue is laid down on top of the cardboard 20 in a closed configuration corresponding to that of the bottom portion 16 of the mold 12, the clay rope 18 may be placed directly thereon before the glue dries, and the clay rope is then held in place solely by the hot glue strip 22, and will not become detached during shipping, or utilization thereof. Not all hot glue systems are suitable for use according to the present invention, but one hot glue ideally suited for practicing the invention comprises a polypropylene rosin blend hot melt, such as one identified commercially as United Resin Products hot melt glue #18-7794 and available from United Resin Adhesives, Inc., of Texas. The hot melt is ideally applied with a Nordson Corporation model 5 hot melt unit.

Under some circumstances, instead of hot glue in the adhesive system utilizing other adhesive components may be employed. For instance, as shown in FIG. 4, white glue 21 and/or masking or polypropylene tape 23 (with pressure sensitive adhesive backing) may be used to hold the clay rope 18 in place. The white glue 21 can be put on in a configuration generally as described above with respect to the hot glue, and then the clay rope 18 placed on top of it, and strips of masking or polypropylene tape 23 placed over the clay rope 18, affixed to the cardboard sheet 20 on either side thereof.

Once a given mold bottom portion 16 configuration is determined, the attachment of the sealing element 18 to the cardboard sheet 20 can be done automatically.

In order to facilitate shipment of the sealing structure 10, it is desirable to construct it so that it can be folded. This is accomplished by providing an offset (e.g., about 1½")—indicated generally by reference numeral 30 in the drawings—in the clay rope 18 when laying it out on the cardboard 20. The offset 30 is provided at a central portion of the cardboard sheet 20, so that the sheet 20 can be folded along lines 32. With the offset 30 provided as indicated (e.g., an offset of about 1½" for a 1¼" diameter clay rope 18), when the sheet 20 is folded about lines 32 the clay rope 18 will not overlap itself. [Also note that the portions 31 of the clay rope 18 are spaced different distances—differing by at least the diameter of clay rope 18—from the fold line 32.] Such a positioning of the clay rope 18 may be readily accomplished since the width of the ingot mold bottom portion 16 is normally much greater than the diameter of the clay rope 18, as may be seen from the exemplary embodiment illustrated in FIG. 1.

The utilization of the sealing structure 10 can be further enhanced by selecting a cardboard sheet 20 that has at least one dimension thereof greater than the corresponding dimension of the mold 14 with which it is to be utilized. For instance, the cardboard sheet 20 selected may be dimensioned so that it has one or more overlapping portions 34 thereof (see FIG. 1). In a typical example, two opposite overlapping portions 34 may be provided, each about 6" in width. These overlapping portions 34 may be grasped by operators on opposite sides of the bottom plate 14 to facilitate maneuvering of the cardboard sheet 20 on top of the bottom plate 14 so that the clay rope 18 is properly positioned beneath the ingot mold bottom portion 16. Positioning is accomplished utilizing these overlapping portions 34 without subjecting the operator(s) to a safety risk.

OPERATION

An exemplary sealing structure 10 according to the present invention having been described, an exemplary method of construction and utilization thereof will now be set forth.

The measurements of a bottom portion 16 of an ingot mold 12 are taken, and the center lines of the bottom portion 16 are laid out in ink on a 4'×4'×⅛" thick piece of rigid cardboard 20. Hot melt glue from a pressurized glue gun is deposited along the ink lines, and a clay rope 18—with an outer polyethylene tube 24 1¼" in diameter and containing a mixture 26 of clay and water, and 15' in length—is placed on the cardboard 20 where the glue strip 22 was deposited before hardening of the glue (e.g., within about 15 seconds). At the mid-points of the outline, the glue strip 22 and the clay rope 18 are offset (30) about 1½". After assembly of the clay rope 18 on the cardboard 20, the cardboard sheet 20 is folded about lines 32, and the sealing structure 10 is shipped to the steel mill.

At the steel mill, the sheet 20 is unfolded and placed by two operators on a bottom plate 14 measuring about 4'×4'. A crane suspends the ingot mold 12 about 4" above the bottom plate 14, and the operators grasp the overlapping portions 34 and adjust the structure 10 so that the clay rope 18 is properly aligned with the bottom portion 16 of the mold 12. The mold 12 is then dropped onto the bottom plate 14, and as it is the clay rope 18 is squashed and some of the clay can be seen extending to the outside of the mold. Conventionally, about two hours later, molten steel is teemed into the mold assembly at a temperature of about 2900° F. There is no evidence of leakage between the mold 12 and bottom plate 14. About four hours after teeming, the mold is stripped from the now-solidified ingot. The ingot that is formed has no fins extending beyond its base. The cardboard and clay residue is easily swept off the bottom plate 14 with compressed air.

It will thus be seen that according to the present invention an efficient, safe, and inexpensive method and structure are provided for effecting a seal between a metal-casting ingot mold and bottom plate.

While the invention has been herein shown and described in what is presently conceived to be the most practical and preferred embodiment thereof, it will be apparent to those of ordinary skill in the art that many modifications may be made thereof within the scope of the invention, which scope is to be according the broadest interpretation of the appended claims so as to encompass all equivalent structures and methods.

What is claimed is:

1. A method of providing a seal between a hot metal-casting ingot mold of metal and bottom plate, the metal ingot mold having a circumferentially extending bottom portion, and utilizing a cardboard sheet, an elongated flexible sealing element, and an adhesive system, said method comprising the steps of:
   (a) placing the elongated flexible sealing element on the cardboard sheet so that the sealing element assumes substantially a closed configuration on the sheet corresponding to the circumferentially extending bottom portion of the mold;
   (b) affixing the sealing element to the cardboard sheet solely with the adhesive system, steps (a) and (b) being practiced so that at a central portion of the cardboard sheet the sealing element is offset so that it still conforms to the general configuration of the ingot mold circumferentially extending bottom portion, but so that the cardboard sheet may be folded without the sealing element overlapping itself;
   (c) folding the cardboard sheet at the central portion thereof;
   (d) transporting the cardboard sheet in folded configuration to the ingot mold site;
   (e) unfolding the cardboard sheet;
   (f) placing the cardboard with affixed sealing element on the bottom plate with the sealing element in alignment with the ingot mold circumferentially extending bottom portion; and
   (g) lowering the ingot mold onto the bottom plate.

2. A method as recited in claim 1 wherein the cardboard sheet has at least one dimension thereof greater than the corresponding dimension of the mold, having an overlapping portion; and wherein step (f) is practiced by holding the overlapping portion of the cardboard sheet so that it does overlap the mold, and moving the cardboard sheet while holding onto the overlapping portion to effect proper positioning of the sealing element.

3. A method as recited in claims 1 or 2 wherein the adhesive system consists of hot glue, and wherein steps (a) and (b) are accomplished by first putting the hot glue on the cardboard in a strip configuration corresponding to the desired configuration of the sealing element thereon, and immediately after placement of a glue strip on a portion of the cardboard sheet—before drying of the glue—placing a corresponding portion of the sealing element into operative contact with the glue strip.

4. A method as recited in claim 3 wherein the sealing element is a clay rope, and wherein the hot glue comprises a polypropylene rosin blend hot melt.

5. A method as recited in claims 1 or 2 wherein the adhesive system comprises glue and tape; and wherein steps (a) and (b) are accomplished by putting the glue on the cardboard sheet in a strip configuration corresponding to the desired configuration of the sealing element thereon; then placing the sealing element on the glue; then putting strips of tape over the sealing element attaching on either side of the sealing element to the cardboard sheet.

6. A method as recited in claim 5 wherein the sealing element comprises clay rope.

7. A method of making a sealing structure adapted to be disposed between a hot metal-casting ingot mold of metal and bottom plate, the metal ingot mold having a circumferentially extending bottom portion, and utilizing a cardboard sheet, an elongated flexible sealing element, and an adhesive system, the method comprising the steps of:
   (a) placing the elongated flexible sealing element on the cardboard sheet so that the sealing element assumes substantially a closed configuration on a sheet corresponding to the circumferentially extending bottom portion of the mold;
   (b) affixing the sealing element to the cardboard sheet solely with the adhesive system, so that at a central portion of the cardboard sheet the sealing element is offset so that it still conforms to the general configuration of the ingot mold circumferentially extending bottom portion, but so that the cardboard sheet may be folded without the sealing element overlapping itself;
   (c) folding the cardboard sheet at the central portion thereof, and
   (d) transporting the cardboard sheet in folded configuration.

8. A method as recited in claim 7 wherein the adhesive system consists of hot glue, and wherein steps (a) and (b) are accomplished by first putting the hot glue on the cardboard in a strip configuration corresponding to the desired configuration of the sealing element thereon; and immediately after placement of a glue strip on a portion of the cardboard sheet—before drying of the glue—placing a corresponding portion of the sealing element into operative contact with the glue strip.

9. A method as recited in claim 8 wherein the sealing element is a clay rope, and wherein the hot glue comprises a polypropylene rosin blend hot melt.

10. A method as recited in claim 7 wherein the adhesive system comprises glue and tape; and wherein steps (a) and (b) are accomplished by putting the glue on the cardboard sheet in a strip configuration corresponding to the desired configuration of the sealing element thereon; then placing the sealing element on the glue; and then putting strips of tape over the sealing element attaching on either side of the sealing element to the cardboard sheet.

11. A sealing structure adapted to be disposed between a metal-casting ingot mold and a bottom plate, and comprising:

a clay rope having a predetermined diameter;
a cardboard sheet; and
means for affixing the sealing element to the cardboard sheet in a closed pattern configuration corresponding to the configuration of an ingot mold bottom portion and so that said clay rope is offset at a central portion of said cardboard sheet a distance greater than the diameter of said clay rope, said affixing means consisting of an adhesive system.

* * * * *